Figure 1:
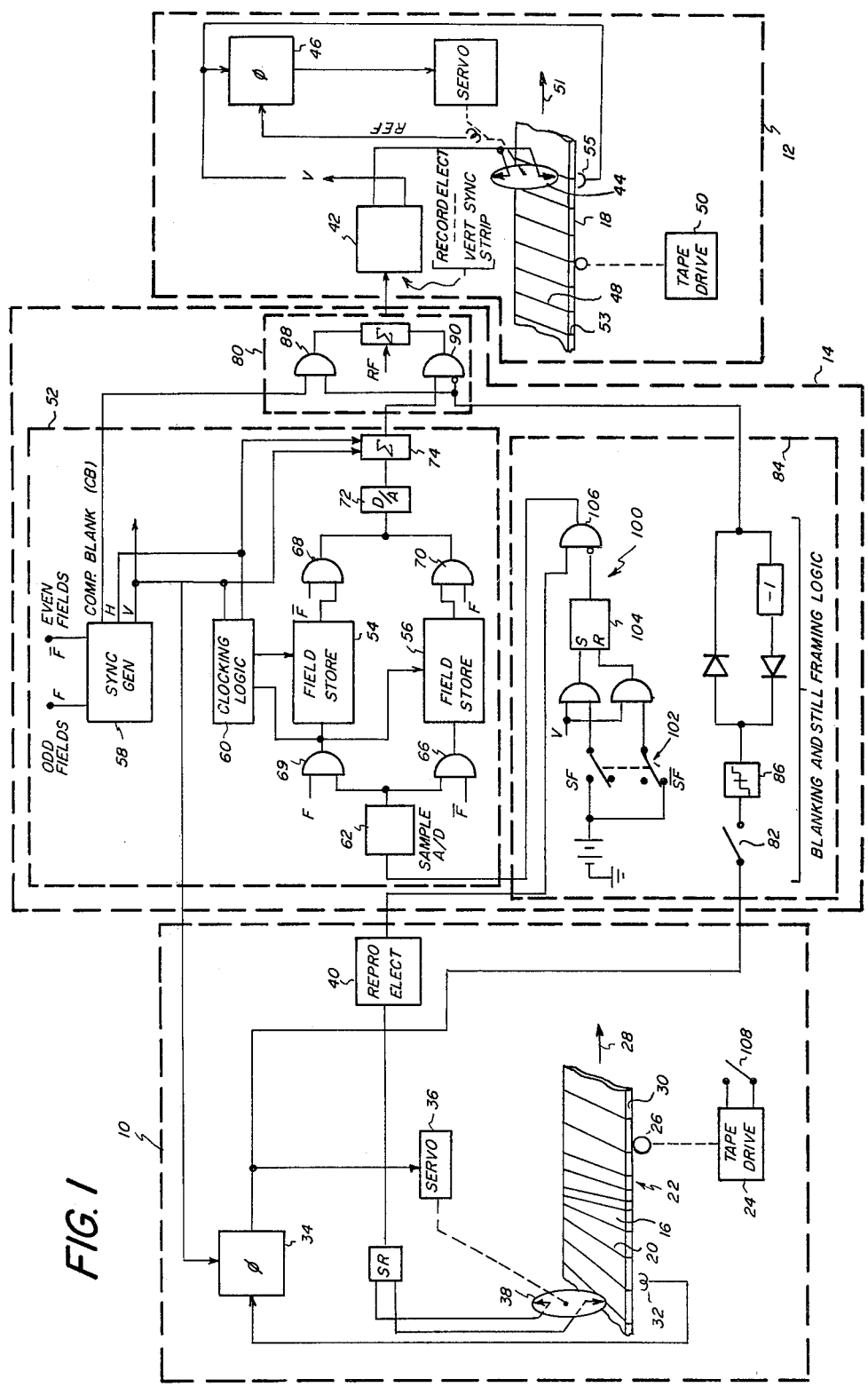

United States Patent [19]

Lemke

[11] 4,334,247

[45] Jun. 8, 1982

[54] APPARATUS USEFUL FOR CONVERTING ASYNCHRONOUS VIDEO INFORMATION TO SYNCHRONOUS VIDEO INFORMATION

[75] Inventor: James U. Lemke, Del Mar, Calif.

[73] Assignee: Spin Physics, Inc., San Diego, Calif.

[21] Appl. No.: 163,247

[22] Filed: Jun. 26, 1980

[51] Int. Cl.³ .............................................. H04N 5/79
[52] U.S. Cl. ....................................... 360/10; 360/32; 360/36; 360/37; 360/38
[58] Field of Search ....................... 360/38, 37, 33, 10, 360/9, 70, 14, 15, 32, 36; 358/127, 182

[56] References Cited

U.S. PATENT DOCUMENTS

| | | | |
|---|---|---|---|
| 3,051,777 | 8/1962 | Lemelson | 360/35 |
| 3,123,668 | 3/1964 | Silva | 360/14 |
| 3,573,359 | 4/1971 | Guisinger | 360/38 |
| 3,721,757 | 3/1973 | Ettlinger | 360/10 |
| 3,748,381 | 7/1973 | Strobele et al. | 360/14 |
| 3,803,350 | 4/1974 | Lemelson | 360/14 |
| 3,919,716 | 11/1975 | Yumde | 360/10 |
| 3,925,815 | 12/1975 | Lemelson | 360/14 |
| 3,991,265 | 11/1976 | Fukuda et al. | 360/14 |
| 4,009,331 | 2/1977 | Goldmark et al. | 360/10 |
| 4,048,650 | 9/1977 | Tanaka et al. | 358/4 |
| 4,057,830 | 11/1977 | Adcock | 360/35 |
| 4,058,840 | 11/1977 | Kasprzak | 360/35 |
| 4,065,788 | 12/1977 | Meier et al. | 358/213 |
| 4,121,242 | 10/1978 | Jonko | 360/37 |
| 4,130,834 | 12/1978 | Mender et al. | 358/134 |
| 4,131,919 | 12/1978 | Lloyd et al. | 360/9 |
| 4,133,009 | 1/1979 | Kittler | 360/9 |
| 4,145,710 | 3/1979 | Venis | 360/9 |
| 4,163,256 | 7/1979 | Adcock | 358/134 |

Primary Examiner—John H. Wolff
Assistant Examiner—Alan Faber
Attorney, Agent, or Firm—Robert F. Cody

[57] ABSTRACT

A pair of field store devices which are slaved to a stable sync signal are employed to record, along with such sync signal, video information on a recording medium. During periods of asynchronism in the video input to the field store devices, synchronous noise or a synchronous blank is inserted into the output of the field store devices. Such use of field store devices enables (1) the easy conversion of one recording format to another; (2) the splicing of scenes recorded on different tapes of the same, or different formats to be effected on a tape with any format; and (3) the recording of stillframe scene information.

15 Claims, 2 Drawing Figures

APPARATUS USEFUL FOR CONVERTING ASYNCHRONOUS VIDEO INFORMATION TO SYNCHRONOUS VIDEO INFORMATION

BACKGROUND OF THE INVENTION

1. Field of the Invention

This invention relates to video tape recording apparatus and in particular to apparatus for producing a synchronized video tape recording from asynchronously recorded video information.

2. Discussion Relative to the Prior Art

Although apparatus embodying the invention has a wide variety of uses, the description of a particular problem which such apparatus solves is perhaps best illustrative of the present state of the art: A video camera for use in producing a recorded tape that is playable in a consumer video recorder typically cooperates with a shoulder-carried helical-scan recorder for producing a helical-scan video recording of various scenes. In its usual form, the shoulder-carried recorder has a continuously running head-wheel and a tape transport which runs, like a conventional photographic movie camera, at the whim of the camera operator. For example, the operator will record a scene by pressing his tape-advance button; stop the scene recording when desired by releasing the "button"; shoot another scene by pressing the "button"; stop recording that scene by again releasing the "button"; and so on, all the while the head-wheel continuously runs. What ensues, therefore, is a series of recorded scenes which have proper sync therewithin, but which are all asynchronous with respect to each other. When playing such a recording of asynchronously recorded scenes through a consumer recorder operating in its playback mode, the television which cooperates with the recorder may exhibit, in varying degrees, one or more of the following disturbances as the servos of the recorder try to switch from locking on to one recorded scene to locking on to the next recorded scene: picture roll-over; a vertically traveling bar within the television display; picture tear; jitter. Such disturbances are bad in and of themselves, but are especially distressful when the cooperating television has a long time constant in its vertical and horizontal sync circuits. In such cases the disturbances may be quite long-lived.

Although apparatus embodying the invention is primarily adapted to solve the aforementioned problem, such apparatus has inherent versatility and may be employed, for instance, to "splice" scene information from two or more tapes of asynchronized information; which tapes may or may not have the same recording format; and which "spliced" scene information may be recorded in any of a variety of different formats. Scenes recorded on two different tapes which are, for example, playable on a Betamax machine (Sony Corp.) may be "spliced" together and recorded on a tape having either the Betamax or the VHS (Panasonic; Matsushita Corp.) formats. Or, a scene recorded in the Betamax format may be "spliced" to a scene recorded in the VHS format, and the resultant "spliced" scene information may be recorded in either the Betamax or the VHS formats, etc. Such techniques, as well as an improved still-framing technique which is both devoid of the image degradation that commonly occurs when using a consumer recorder in a still-framing mode, and which cannot cause undue tape and head wear while still-framing, will be discussed in detail below. Indeed, a form of still-framing may, by means of the invention, be provided to a video recorder which otherwise does not have such capability.

SUMMARY OF THE INVENTION

The concept of the invention is to use a frame store device (i.e. a pair of field store devices), which is slaved to a stable sync circuit, as a signal source for apparatus that records video information processed by the frame store device. The recording apparatus is likewise slaved to the stable sync circuit, as is a playback apparatus disposed to play back video information in which successive scenes are asynchronous with respect to each other. Whether the servos of the playback apparatus are hunting or not (i.e. while going from one recorded scene to another) the recording apparatus records video information that is continuously synchronous. During scene-to-scene periods of asynchronism, however, what is recorded is either "synchronous noise" or, as is preferred, a "synchronous blank". Synchronous noise when played through a television manifests itself as a pictureless, illuminated display; a synchronous blank, or on the other hand, results in (periodically) a darkened television tube face. In either case, the invention assures that the display of the cooperating television is not subjected to roll, jitter, tear, and the like as caused by scene switching.

Because the frame store is slaved to a stable sync circuit, its output will be in proper sync so long as its input is in proper sync. Thus, aside from correcting for asynchronism between successive scenes, apparatus embodying the invention may be employed, as noted above, to splice scene information from any of several tapes which may, or may not, be in the same format. By maintaining each source of scene information in sync with the operation of the frame store, the scenes may be spliced together without asynchronism. Should any asynchronism result during playback through the frame store, as might occur between scenes reproduced from either or both sources, "synchronous noise", or a "synchronous blank", is substituted for the output of the frame store. In this way, a recording is made (in any selected format) in which the recorded information is always, assuredly, synchronous from one end of the tape to the other.

Figure 2:
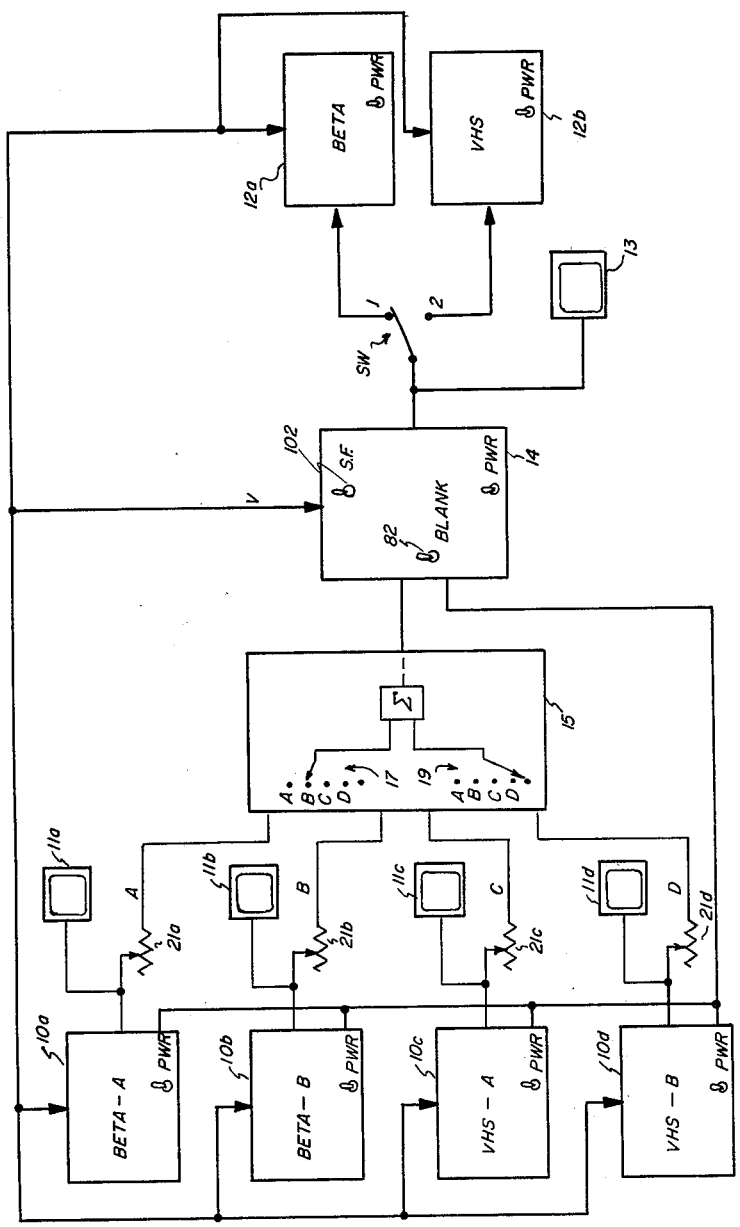

Still-framing, as well as greater detail of the invention, will be discussed in relation to the figures wherein:

FIG. 1 is a schematic block diagram illustrating apparatus employing the invention and FIG. 2 is a schematic block diagram of a scenesplicing system incorporating the invention.

Before addressing the detailed workings of the invention, it is believed appropriate to provide an over view of the hardware which embraces the invention. With this in mind, therefore, reference should be had to FIG. 1 which illustrates a video tape playback apparatus 10 for reproducing signals recorded on a magnetic tape 16, and a video tape recorder apparatus 12 for recording video signals which it receives. In one practice of the invention, the tape transports of the apparatuses 10, 12, which are shown in simplified detail, would both be, say, of the Betamax-type. Signals produced by the apparatus 10 are so processed through a synchronizing circuit 14 that, when such signals are applied from the circuit 14 to the apparatus 12, they get recorded, thereby, in a correct format, and with proper sync. In other words, given that the apparatus 10 is disposed to reproduce signals from an asynchronously recorded magnetic tape 16, the circuit 14 will process such signals so as to effect a properly formated tape recording 18. The tape 16 is one which, say, was recorded by use of a consumer video camera, the camera-user causing the camera tape advance to start, and then stop, each time a new scene is recorded. As a result of such intermittent recording of scenes, the slant tracks 20 which are recorded on the tape 16 periodically squinch, and then spread apart (22), as the successive scenes are shot. Were such a tape 16 played through a commercial video recorder operating in its playback mode, the display of the cooperating television in all likelihood would be periodically disturbed as the servos of the recorder hunted within the times corresponding to the tape regions 22.

As is known, the tape transport apparatus 10 comprises a drive 24 which drives, at uniform speed, a capstan 26 which advances the tape 16 in the direction of the arrow 28. The tape 16 has a control track 30 having pulses recorded therein at the nominal field rate of 60 hz, the tracks 20 each corresponding to a respective video field. The output of a pickup head 32, cooperative with the control track 30, is applied to a phase-comparator 34 to produce an error signal for controlling the operation of a head-wheel servo 36; and signals produced by the head-wheel (38) are applied via slip rings (SR) to reproduce electronics 40 adapted to produce the baseband video signal from the signals which it receives. Save for one external reference signal input from the circuit 14 to the apparatus 10, the apparatus 10 is a known apparatus, and indeed may form part of a Betamax machine.

The tape transport apparatus 12 may also be of any commercial design, and operates in a known manner to record video signals which it receives via its input leads: Received signals are fed from record electronics 42 to the heads of a head-wheel 44, the rotary position of which is slaved to a reference signal having a reference phase. The reference signal is produced by means of (a) pulse coil(s) on the head-wheel shaft and is phase-compared, in a circuit 46, to the incoming vertical sync signal V, thereby to assure that the slant tracks 48 of the tape 18 each represent one discrete video field and are evenly spaced along the length of the tape 18. The tape 18 is driven at uniform speed, by a drive 50, in the direction of the arrow 51; and a control track 53 containing pulses corresponding to the vertical sync pulses V is recorded by means of a head 55.

At the heart of the circuit 14 is a frame store device 52. Frame store devices may take a variety of forms (such for example as a pair of circular tracks on a rotary disc, the tracks corresponding respectively to the two fields of the stored frame) but because of the availability of relatively low cost, and versatile, solid-state frame store devices, such are preferred. Typically, a solid-state frame store device (e.g. a frame store such as that available from Colorado Video Inc., Box 928, Boulder, Colorado 80306, part designation "Video Expander 275") comprises a pair of digital field stores 54, 56 consisting of random access memory devices (RAMs). A sync generator 58 supplies reference signals for feeding successive video fields into the field stores 54, 56, the sync signals being applied to clocking logic 60 (typically comprised of counters) adapted to count bits, corresponding to picture elements (pixels), one by one into one field store and, when the last bit, of the last pixel, of the last line of a field, is counted into a field store, the logic 60 switches to feed the digitized next field into the other field store. As is known, such a frame store device 52 includes a sample-and-hold circuit and a cooperating analog-to-digital convertor 62, for converting the analog output of the apparatus 10 into digital form. Logic devices 64, 66 and 68, 70 cooperate to assure that while bits corresponding to one field are fed into one field store, bits corresponding to the just prior field are read out of the other field store, and vice versa. A digital-to-analog convertor 72 receives the outputs of the field stores and reconverts such outputs to analog form; and since the field stores do not store sync information, a circuit 74 is provided to reconstitute the composite video baseband signal by reinserting sync into the output of the field stores. It is again noted that frame store devices are conventional and commercially available, although admittedly some such devices may be more versatile than others. In any event, the usual frame store device is functionally quite like that identified herein as frame store device 52.

So that the video output of the frame store device 52 may be recorded by use of the apparatus 12, the baseband signal is placed on a (vacant channel) carrier by means of a circuit 80. Thus, as far as the recorder apparatus 12 is concerned, it sees a video input which for all intents and purposes is an off-the-air video signal that meets stringent broadcast requirements; and accordingly, the tape 18 is recorded with proper sync and format along its entire length.

Given, for the moment, that a switch 82 of a blanking and still-framing logic circuit 84 is open, it is interesting to consider the recording which is made on the tape 18 when the transport of the apparatus 10 encounters an asynchronism: During playback of the tape 16, prior to reaching the tape region 22, the reproduce electronics 40 alternately feeds signals corresponding to properly recorded odd and even fields into the field stores 54, 56 respectively; and while one field is being loaded into a field store, the other field is being unloaded. So long as the rate of occurrence of pulses in the control track 30 is uniform, and correct, the video information is transferred routinely from the tape 16 to the tape 18. At the moment the tape region 22 is encountered, however, the servo 36 of the apparatus 10 drives to change the speed of the head-wheel 38 so that it gets back on track. While the servo hunts, the output of the reproduce electronics 40 constitutes noise which is processed through the frame store device 52. Notwithstanding its character, however, the processed noise is forced into, and provided with, proper sync and recorded (by the apparatus 12) according to the proper format, this being because both the frame store device and the apparatus 12 are slaved to the same stable sync 58. What occurs when playing back a tape 18 so produced, therefore, is a series of successive scenes and, periodically (i.e. during servo hunting between scenes), the television tube face goes white; but there is, otherwise, no display jitter, roll, etc.

As is preferred, the switch 82 of the blanking and still-framing logic circuit 84 is kept closed: Attendantly, the phase-error output of the phase-detector 34 (the magnitude of which output is characteristic of the degree to which the servo 36 is tracking) is applied to a dead zone circuit 86; and when such error exceeds, in either sense, the thresholds of such circuit, a signal is applied to logic gates 88, 90 within the circuit 80. Absent an error signal processed out of the circuit 84, the composite video output of the circuit 74 flows via the gate 90. In the presence of a circuit 34 error signal that exceeds the aforenoted thresholds, however, the gate 90 is turned off, and the gate 88 is turned on, causing a composite blank (i.e. a blanking signal which includes sync signals) to be processed and recorded by the recorder apparatus 12. Such being the case, the recording appearing on the tape 18 is composed of a succession of properly recorded scenes interspaced with properly recorded blanking signals, i.e. it is completely synchronous along its entire length. And, when such a recording is played through a television set, the television tube face will go, in a non-annoying way, dark in-between the successive scenes which are played.

Since the frame store device 52 processes whole frames produced by means of the apparatus 10, a still-framing function may be provided in the FIG. 1 apparatus by interrupting, for as long as desired, the flow of signals into the frame store device 52 while continuously reading out those stored frame signals which are within the frame store device. In this way successive slant tracks of the same frame will be recorded on the tape 18; and attendantly there will be no need to pass a playback head successively, and abrasively, over the same track just to effect a still-frame (and which still-frame, because it is effected by a playback head that skewingly traverses the track being repeatedly played, is inherently of diminished bandwidth). To interrupt the flow of frame signals into the frame store device 52, a circuit 100 is provided. When a double pole, single throw, switch 102 is actuated, at the occurrence of the start of the next field (signal V), a flip-flop circuit 104 is set, causing a gate 106 to interrupt the flow of frame signals into the frame store device 52, whereby the same stored frame signals therein are continuously, and non-destructively, read out for recording by the recorder apparatus 12. By reactuating the switch 102, the flip-flop 104 will reset at the start of the next occurring field (signal V), whereby the gate 106 will resume processing the frame signals recorded on the tape 16. Thus, the copy tape 18 that results contains still-frame signals along its length, the length and duration of which corresponds to the time that the switch 102 was actuated.

A switch 108, cooperative with the tape drive 24 of the apparatus 10, is provided to allow the tape 16 selectively to advance, or not, while effecting the aforenoted still-framing.

It was indicated above that the invention is versatile and lends itself to a variety of uses such, for example, as scene splicing and format changing: Reference, therefore, should be had to FIG. 2 which depicts not one, but four, transport apparatuses 10a, b, c, d, selectively cooperative with two recorder apparatuses 12a, b via a synchronizing circuit 14 and a switch labeled "SW". To be noted is that the apparatuses 10a, b and 12a are of the Betamax-type, whereas the apparatuses 10c, d and 12b are of the VHS-type. Indeed, the apparatuses 10a, b, c, d and 12a, b may be commercially available consumer recorder playback machines, or, if preferred, they may be machines adapted to any other recording format. Television monitors, 11a, b, c, d display scenes corresponding to signals produced respectively by the apparatuses 10a, b, c, d; and a television monitor 13 displays scenes corresponding to signals processed by the synchronizing circuit 14. An input selector 15, having a pair of switches 17, 19, effects switching among the apparatuses 10a, b, c, d; and potentiometers 21a, b, c, d permit a lap-and-dissolve function, as will be discussed below.

The versatile workings of the apparatus of FIG. 2 are best illustrated by way of a couple of examples: (1) splicing a "scene" produced by use of the Betamax-type apparatus 10b to a "scene" produced by use of the Betamax-type apparatus 10a to provide a synchronous recording of spliced scenes on a tape processed by the Betamax-type apparatus 12a; and (2) splicing a scene produced by use of the VHS-type apparatus 10c to a scene produced by use of the Betamax-type apparatus 10b to provide a synchronous recording of spliced scenes on a tape processed by the VHS-type apparatus 12b.

EXAMPLE 1

With the apparatus 12a power on, the switch SW at its position 1, the switch 17 at its position B, the switch 19 at its "open" contact, the synchronizing circuit power on, and the apparatus 10b power on, the recording of the apparatus 10b is transferred routinely to the recording processed within the apparatus 12a. With the recording of the apparatus 10a already advanced to about the point where the splicing is to be effected power to the apparatus 10a is switched on, and, a moment later, the switch 17 is switched to its open contact and the switch 19 is switched to its contact A. Automatically, the recording processed within the apparatus 12a switches from one scene from one apparatus (10b) to another scene from a different apparatus (10a). Should any asynchronism occur between or within the scenes processed into the apparatus 12a, synchronous noise or, more preferably, a synchronous blank, as described above, is inserted into the recording being processed by the apparatus 12a. (Still-framing, if desired, may also be provided as discussed above). To effect a lap-and-dissolve between the scenes originating from the two sources 10b, 10a, the effective resistances of the potentiometer of 12b is decreased while that of the potentiometer 12a is increased at the time of scene splicing. This feature may, of course, be provided automatically, for example by any form of ascending or descending ramp-producing apparatus, as is well known to those skilled in the art.

EXAMPLE 2

With the switch 19 set to its position C, the switch 17 switched to its "open" contact, the switch SW set to its position 2, and power applied to the apparatus 10C, the synchronizing circuit 14, and the apparatus 12b, the VHS recording processed by the apparatus 10C is transferred to a VHS recording processed by the apparatus 10b. Having preadvanced the Betamax recording processed by the apparatus 10b to the point of the splice, power to the apparatus 10b is turned on just prior to the time of the splice and, at the time of the splice, the switch 19 is set to its "open" contact as the switch 17 is set to its position B. All forms of asynchronism between and within recordings being precluded by the circuit 14, the desired synchronous VHS-type recording is effected from one VHS-type and one Betamax-type recording. Either synchronous noise, or a synchronous blank, can be caused to appear within the recording processed by the apparatus 12b, as discussed above; and the lap-and-dissolve feature provided, if desired, in the manner described above.

The invention has been described in detail with particular reference to preferred embodiments thereof, but it will be understood that variations and modifications can be effected within the spirit and scope of the invention. For example, having substituted, say, a synchronous blank for a period of scene-to-scene asynchronism, it would, conceptually be within the scope of the invention to increase gradually the strength of those signals corresponding to the scene that follows the synchronous blank, thereby to "fade in" such scene, instead of having an abrupt transition between such scenes.

What is claimed is:

1. Apparatus useful with
   (a) a first device for playing video information signals magnetically recorded along the length of a magnetic tape, and which video information signals may be periodically asynchronous with respect to a timing reference, and
   (b) a second device for recording, under control of a vertical sync signal, video information signals along the length of a magnetic tape,
said apparatus comprising
   (a) means for producing horizontal and vertical sync signals having respective nominal frequencies,
   (b) means for receiving and temporarily storing video information signals under control of said vertical sync signal, said means for receiving and storing being adapted to receive video information signals played back by said first device,
   (c) means adapted to receive said vertical and horizontal sync signals and the video information signal output of said means for receiving and temporarily storing video information signals for combining said video information signal output with said vertical and horizontal sync signals into a composite video signal,
said means for combining being coupled to said second device to apply said composite video signal to said second device, and said apparatus including means for applying said vertical sync signal to said first device for controlling its operation,
whereby despite periods of asynchronism in the video information signals played back by said first device, said second device records video information signals without periods of asynchronism therein.

2. The apparatus of claim 1
   (a) wherein said means for producing horizontal and vertical sync signals further includes means for producing a composite blanking signal comprised of said horizontal and vertical sync signals and a blanking signal, and
   (b) wherein said apparatus further includes (1) means for detecting periods of asynchronism in the video information signals applied to said means for receiving and temporarily storing, and (2) means cooperative with said means for detecting for applying said composite blanking signal to said second device as a substitute for said composite video signal during such periods of asynchronism,
whereby during playback of the recording made by said second device the display associated therewith periodically darkens between otherwise coherent scenes which are displayed.

3. The apparatus of claim 2 including second means cooperative with said means for detecting for relatively abruptly removing said composite blanking signal from said second device at the conclusion of said periods of asynchronism, and for gradually increasing to a reference level the intensity of the video portion of said composite video signal after such signal is reapplied to said second device.

4. The apparatus of claim 1 wherein
   (a) said video information signals are comprised of signals representing odd and even fields of said video information,
   (b) said means for receiving and temporarily storing is comprised of a pair of digital field store devices adapted to receive, respectively, said signals representing the odd and even fields of said video information, and
   (c) said field store devices are adapted to receive, and be clocked by, said horizontal sync signal.

5. The apparatus of claim 4 including means for selectively interrupting the application of said video information signals to said means for receiving and temporarily storing while continuously and non-destructively clocking out the video information signals stored therein,
whereby said second device will repeatedly record the same signal along the length of its tape for the duration of said interruption, thereby to provide such tape, when played back, with a still-framing feature.

6. Apparatus for processing video information, comprising
   (a) first apparatus, including tape transport apparatus, for use in playing back video information signals recorded along a length of magnetic tape, said first apparatus being adapted to receive a sync signal for controlling the operation of said first apparatus,
   (b) second apparatus, including second tape transport apparatus, for use in recording video information signals along a length of magnetic tape, said second apparatus being adapted to receive a sync signal for controlling the operation of said second apparatus,
   (c) sync generator means for producing vertical and horizontal sync signals having respective nominal frequencies,
said vertical sync signal being applied to said first and second apparatuses for controlling the operations of those apparatuses,
said horizontal sync signal being applied to said second apparatus for recording thereby, along with the vertical sync signal applied thereto, on tape transported by that apparatus, and
   (d) video information storage means responsive to and controlled by said vertical sync signal for receiving and storing played back video information signals from said first apparatus, said video information storage means being adapted to apply the video information signals which it receives and stores to said second apparatus for recording thereby,
whereby said second apparatus continuously records synchronous video information signals along the length of the tape which it transports despite periods of asynchronism in the video information signals played back by said first apparatus.

7. The apparatus of claim 6 wherein
   (a) said first apparatus is adapted to cooperate with and play back signals from a magnetic tape recorded in a first recording format, and
   (b) said second apparatus is adapted to cooperate with and record signals on a magnetic tape according to a second recording format.

8. The apparatus of claim 7 wherein
   (a) said video information signals are comprised of signals representing odd and even fields of said video information, (b) said video information storage means is comprised of a pair of digital field store devices adapted to receive, respectively, said signals representing odd and even fields of said video information, and
(c) said field store devices are adapted to receive, and be clocked by said horizontal sync signal.

9. The apparatus of claim 8 including means for selectively interrupting the application of said video information signals to said video information storage means while continuously and non-destructively clocking out the video information signals stored therein,
whereby said second apparatus will repeatedly record the same signal along the length of its tape for the duration of said interruption, thereby to provide such tape, when played back, with a still-framing feature.

10. The apparatus of claim 9 including means for selectively disabling the tape transport apparatus of said first apparatus while said means for selectively interrupting the application of said video information signals is actuated, thereby to permit continuous playback, or not, of said first apparatus while effecting said still-framing feature.

11. The apparatus of claim 6 including
(a) means for producing a blanking signal, and
(b) means for substituting said blanking signal for said video information signal applied to said second apparatus in response to and whenever there is asynchronism between said video information signal played back by said first apparatus and said vertical sync signal applied to said first apparatus.

12. The apparatus of claim 6 wherein
(a) said video information signals are comprised of signals representing odd and even fields of said video information,
(b) said video information storage means is comprised of a pair of digital field store devices adapted to receive, respectively, said signals representing odd and even fields of said video information, and
(c) said field store devices are adapted to receive, and be clocked by said horizontal sync signal.

13. The apparatus of claim 6 wherein
(a) said first apparatus is comprised of at least two different playback apparatuses both of which are adapted to receive and be controlled by said vertical sync signal, and
(b) said apparatus for processing video information further includes
(1) means for selectively applying the video information signals played back by either of said playback apparatuses to said video information storage means, and
(2) means for selectively varying the strength of the video information signals produced by said playback apparatuses,
whereby the magnetic tape recording made by said second apparatus may be provided with video information from one playback apparatus that has been dissolvedly lapped to said video information from the other playback apparatus.

14. The apparatus of claim 13 wherein said two different playback apparatuses are adapted to cooperate with and play back signals from magnetic tapes recorded in the same recording format.

15. The apparatus of claim 13 wherein said two different playback apparatuses are adapted to cooperate with and play back signals from magnetic tapes recorded in different recording formats.

* * * * *